United States Patent Office 3,099,563
Patented July 30, 1963

3,099,563
PROCESS FOR PRODUCING FOAM STABILIZER FOR BEER
Paul L. Smith, Winter Park, Fla., assignor to Union Carbide Corporation, a corporation of New York
No Drawing. Filed Oct. 25, 1961, Ser. No. 147,437
5 Claims. (Cl. 99—48)

The present invention relates generally to a process for producing a foam stabilizer for beer and, more particularly, to a process for producing such a foam stabilizer by hydrolysis of a recovered by-product of beer manufacture.

As used herein, the term "beer" refers to lagered or unlagered beer, ale, porter, stout, and other similar fermented beverages (including same or similar products) of any name or description containing one-half of one percent or more of alcohol by volume, brewed or produced from malt, wholly or in part, or from any substitute therefor.

Heretofore, it has been proposed to produce a foam stabilizer for beer by hydrolysis of a recovered by-product of beer manufacture, such as spent grains or trub, with an acid, alkali, or proteolytic enzyme. It has also been proposed to remove the turbidity-producing materials from such hydrolysates by adjusting the pH of the hydrolysate to the acid side so as to precipitate the turbidity-producing protein complexes. Such a process is described in detail in U.S. Patent No. 2,806,791, entitled "Stabilization of Foams."

It is the main object of the present invention to provide a process for producing a foam stabilizer for beer by hydrolysis of a recovered by-product of beer manufacture without the need for an acid, alkali, or proteolytic enzyme.

Another object of the invention is to provide such a process wherein materials which produce turbidity in beer are removed from the foam stabilizer without the need for adjusting the pH of the hydrolysate.

A further object of the invention is to provide a concentrated foam stabilizer for beer.

Other aims and advantages of the invention will be apparent from the following description and appended claims.

In accordance with the present invention, there is provided a process for producing a foam stabilizer for beer comprising hydrolyzing at least one recovered by-product of beer manufacture selected from the group consisting of spent grains and hop residues at a temperature of at least 212° F.; freezing water from the resulting hydrolysate so as to increase the concentration thereof and to precipitate materials which produce turbidity in beer; and separating the concentrated hydrolysate from the ice and precipitate.

The inventive process produces a foam-stabilizing hydrolysate without the use of an acid, alkali, or proteolytic enzyme by carrying out the hydrolysis at a relatively high temperature. Although the novel process is operable at atmospheric pressure, it is preferred, to carry out the hydrolysis at an increased pressure, preferably between 25 and 200 p.s.i.g. The preferred temperature range is 250 to 350° F. The hydrolysis should be continued for at least five minutes and may be carried out in any suitable apparatus, such as an autoclave.

In order to produce a foam stabilizer which will not produce haze or turbidity in the beer to which it is added, the turbidity-producing material, such as protein complexes, must be removed from the hydrolysate. In the past, the removal of such materials from similar hydrolysates has been accomplished by adjusting the pH of the hydrolysate to the acid side to precipitate the turbidity-producing material and then removing the precipitate by filtration. In the process of the invention, the precipitation of the turbidity-producing materials is achieved without adjusting the pH value of the hydrolysate by freezing water from the hydrolysate so as to increase its concentration; the increased concentration and decreased temperature conditions effected by the freeze concentration process cause the turbidity-producing material to form a precipitate, which is then removed by a centrifugal screen or any other suitable separating means.

If the foam stabilizer is to be added to the beer before the normal turbidity-elimination procedure, e.g., before the lagering or freeze concentration of the beer, it is not necessary to remove the turbidity-producing material from the hydrolysate prior to its addition to the beer. In other words, the turbidity-producing material in the hydrolysate may be removed along with similar material in the beer after the hydrolysate has been added to the beer. For example, the unconcentrated hydrolysate may be added to beer taken directly from the fermenters; the resulting mixture of beer and hydrolysate can then be lagered by a freeze concentration process, which removes the turbidity-producing material from both the beer and the hydrolysate.

The starting material for the hydrolysis process is spent grains and/or hop residues from a conventional brewing process. Spent grains are the water-insoluble portion of the grains which remain from the brewing process, and hop residues are that portion of the hops which is not solubilized or dissolved at the temperatures and pressures normally encountered in the brewing process.

Malted barley, which is used in most brewing processes, contains about 10% by weight proteins, either as pure proteins or in combination with tannins, carbohydrates, or other such materials. During the brewing process, about one-third of the barley proteins are solubilized by enzyme action and brought into solution. The remainder of the proteins are left as a residue and are filtered or settled out along with the balance of the unused grains. This product is known as spent grains, which is the preferred starting material for the inventive process. A typical analysis of a spent grain is as follows:

| | Percent by weight |
|---|---|
| Protein | 24 |
| Fat | 5 |
| Fiber | 18 |
| Non-protein, non-fat, non-fiber, such as hemicelluloses and moisture | Remainder |

The amount of water added to the spent grains or hop residues for the hydrolysis process is not critical, but it is preferred to use a weight of water between about one and ten times the weight of the spent grains or hop residues employed.

In order to facilitate freeze concentration of the resulting hydrolysate, the liquid portion thereof may be separated from the solids by filtration. Any convenient filtering means may be used, but the two filters most commonly used in the brewing industry are pulp filters and diatomaceous silica filters. Pulp filters normally consist of numerous filter cakes from 2 to 2.5 inches thick held tightly in frames. Diatomaceous silica filters normally consist of fine screens or cloths mounted in a tank or frame; silica is suspended on the screens and forms the main filtering medium.

In the freeze concentration of the liquid portion of the hydrolysate, the temperature of the liquid is decreased to at least 32° F. so as to freeze water from the hydrolysate, thereby precipitating the materials which produce turbidity in beer and forming a slurry of concentrated foam stabilizer, ice, precipitate, and any other solids remaining in the liquid portion of the hydrolysate. It is preferred to increase the concentration of the liquid hydrolysate to about four-fold by volume, i.e., about one-fourth of the original volume of the liquid hydrolysate. Freeze tanks are well known in the art of freeze concentration, and a typical freeze tank suitable for use in the present process is described in detail in U.S. Patent 2,657,549, entitled "Freezing Apparatus." The walls of the freeze tanks are connected to a conventional refrigeration system, and agitating means may be disposed within the tanks to prevent formation of ice on the tank walls. Ruh beer may be added to the hydrolysate to depress the freezing point for the freeze concentration process.

From the freeze tank, the slurry of concentrated stabilizer, ice, and precipitate is passed into a separator. The separator, which is preferably a centrifugal separator but may be any other suitable separating means, removes the ice and precipitate from the concentrated stabilizer.

The concentrated stabilizer should be added to the beer prior to ruh storage, e.g., after the brew kettle or fermentation. If the beer is to be concentrated, the concentrated stabilizer may be added before or after the beer has been concentrated.

In a preferred embodiment of the inventive process, spent grains from the lauter tuns of the conventional brewing operation are added to an equal weight of water in an autoclave, heated to a temperature of about 267° F. at a pressure 25 p.s.i.g., and held at that temperature and pressure for one hour. The liquid portion of the resulting hydrolysate is separated from the solids by a filtering operation and fed into a first freeze tank. Water is frozen from the liquid in the first freeze tank until the concentration thereof has been increased to about two-fold by volume. The resulting slurry, which contains precipitated turbidity-producing materials along with the ice, is fed into a first centrifugal screen, where the concentrated stabilizer is separated from the ice, precipitate, and any other solids remaining therein. The two-fold concentrate is then fed into a second freeze tank, wherein the concentration is increased to about four-fold, and thereafter a second separator.

The concentrated foam stabilizer has little or no effect on the flavor of the beer to which it is added and, because it is concentrated, can be added in extremely small quantities which cause no dilution problems.

While various specific forms of the present invention have been illustrated and described herein, it is not intended to limit the invention to any of the details herein shown, but only as set forth in the appended claims.

What is claimed is:

1. A process for producing a foam stabilizer for beer comprising hydrolyzing at least one recovered by-product of beer manufacture selected from the group consisting of spent grains and hop residues at a temperature of at least 212° F. for at least about 5 minutes; freezing water from the resulting hydrolysate so as to increase the concentration thereof and precipitate materials which produce turbidity in beer; and separating the concentrated hydrolysate from the ice and precipitate.

2. A process for producing a foam stabilizer for beer comprising hydrolyzing at least one recovered by-product of beer manufacture selected from the group consisting of spent grains and hop residues at a temperature of at least 212° F. for at least five minutes; removing the liquid portion from the resulting hydrolysate; freezing water from said liquid portion so as to increase the concentration thereof and precipitate materials which produce turbidity in beer; and separating the concentrated liquid from the ice and precipitate.

3. A process for producing a foam stabilizer for beer comprising hydrolyzing at least one recovered by-product of beer manufacture selected from the group consisting of spent grains and hop residues at a temperature between about 250 and about 350° F. and a pressure between about 25 and 200 p.s.i.g. for at least five minutes; separating the liquid and solid portions of the resulting hydrolysate; freezing water from said liquid portion so as to increase the concentration thereof and precipitate materials which produce turbidity in beer; and separating the concentrated liquid from the ice and precipitate.

4. A process for producing a foam stabilizer for beer comprising mixing at least one recovered by-product of beer manufacture selected from the group consisting of spent grain and hop residues with a quantity of water between one and ten times the weight of said by-product; hydrolyzing the resulting mixture at a temperature between 250 and 350° F. for at least five minutes; separating the liquid and solid portions of the resulting hydrolysate; freezing water from said liquid portion so as to increase the concentration thereof and precipitate materials which produce turbidity in beer; and separating the concentrated liquid from the ice and precipitate.

5. A process for producing a foam stabilizer for beer comprising hydrolyzing at least one recovered by-product of beer manufacture selected from the group consisting of spent grains and hop residues at a temperature between 250 and 350° F. for about one hour; filtering the resulting hydrolysate so as to separate the liquid and solid portions thereof; freezing water from said liquid portion so as to increase the concentration thereof to about four-fold by volume, thereby precipitating materials which produce turbidity in beer; and separating the concentrated liquid from the ice and precipitate.

References Cited in the file of this patent

UNITED STATES PATENTS 2,806,791     Frieden et al.            Sept. 17, 1957